United States Patent
Fürst et al.

(10) Patent No.: US 10,053,039 B2
(45) Date of Patent: Aug. 21, 2018

(54) METHOD FOR CONTROLLING RESTRAINT DEVICES OF A MOTOR VEHICLE

(75) Inventors: Franz Fürst, Buxheim (DE); Markus Larice, Karlskron (DE); Tobias Dirndorfer, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/119,707

(22) PCT Filed: May 8, 2012

(86) PCT No.: PCT/EP2012/001963
§ 371 (c)(1),
(2), (4) Date: Nov. 22, 2013

(87) PCT Pub. No.: WO2012/159707
PCT Pub. Date: Nov. 29, 2012

(65) Prior Publication Data
US 2014/0100742 A1    Apr. 10, 2014

(30) Foreign Application Priority Data
May 23, 2011 (DE) .................. 10 2011 102 298

(51) Int. Cl.
*B60R 21/01* (2006.01)
*B60R 21/0132* (2006.01)
(Continued)

(52) U.S. Cl.
CPC ...... *B60R 21/0132* (2013.01); *B60R 21/0136* (2013.01); *B60R 21/0156* (2014.10);
(Continued)

(58) Field of Classification Search
CPC ............ B60R 21/0132; B60R 21/0136; B60R 21/0156; B60R 2021/01211
See application file for complete search history.

(56) References Cited

U.S. PATENT DOCUMENTS 7,036,845 B2 *   5/2006   Bentele-Calvoer et al. . 280/735
2003/0097212 A1  5/2003   Feser et al.
(Continued)

FOREIGN PATENT DOCUMENTS

CN    201419688 Y    3/2010
DE    199 09 538     9/2000
(Continued)

OTHER PUBLICATIONS

Machine translation of DE 10-2004-037-016, printed Dec. 15, 2015.*
(Continued)

*Primary Examiner* — Alan D Hutchinson
(74) *Attorney, Agent, or Firm* — Henry M Feiereisen LLC

(57) ABSTRACT

A method for controlling restraint devices of a motor vehicle includes measuring a movement variable of the motor vehicle, triggering a first restraint device on the basis of a first predefined threshold value for the measured movement variable being exceeded, triggering a second restraint device on the basis of a second predefined threshold value for the measured movement variable being exceeded, and activating a first device influencing the restraining force of the first restraint device and a second device influencing the restraining force of the second restraint device on the basis of the first predefined threshold value and/or the second predefined threshold value being exceeded.

9 Claims, 2 Drawing Sheets

(51) Int. Cl.
  B60R 21/0136 (2006.01)
  B60R 21/015 (2006.01)
  B60R 21/239 (2006.01)
  B60R 22/46 (2006.01)
(52) U.S. Cl.
  CPC .............. *B60R 2021/01211* (2013.01); *B60R 2021/01272* (2013.01); *B60R 2021/01279* (2013.01); *B60R 2021/01322* (2013.01); *B60R 2021/2395* (2013.01); *B60R 2022/4685* (2013.01)

(56) References Cited

U.S. PATENT DOCUMENTS

| | | |
|---|---|---|
| 2004/0216939 A1 | 11/2004 | Lorenz et al. |
| 2006/0255574 A1 | 11/2006 | Ingemarsson et al. |
| 2007/0228704 A1 | 10/2007 | Cuddihy et al. |
| 2008/0319614 A1 | 12/2008 | Kuhn et al. |

FOREIGN PATENT DOCUMENTS

| | | |
|---|---|---|
| DE | 101 07 272 | 8/2002 |
| DE | 102004029373 | 1/2006 |
| DE | 102004037016 | 3/2006 |
| DE | 102007015768 | 10/2007 |
| DE | 602004006119 | 1/2008 |
| DE | 102008063111 | 8/2009 |
| EP | 1 031 474 | 8/2000 |
| EP | 1 356998 | 10/2003 |
| EP | 1 902 908 | 3/2008 |
| EP | 2 161 163 | 3/2010 |
| GB | 2 371 780 | 8/2002 |
| GB | 2 416 896 | 2/2006 |
| WO | WO 02/092396 | 11/2002 |
| WO | WO 2005/035319 | 4/2005 |

OTHER PUBLICATIONS

International Search Report issued by the European Patent Office in International Application PCT/EP2012/001963 dated Aug. 2, 2012 on.

Chinese Search Report dated May 6, 2015 with respect to counterpart Chinese patent application 201280025432.7.

Translation of Chinese Search Report dated May 6, 2015 with respect to counterpart Chinese patent application 201280025432.7.

\* cited by examiner

METHOD FOR CONTROLLING RESTRAINT DEVICES OF A MOTOR VEHICLE

CROSS-REFERENCES TO RELATED APPLICATIONS

This application is the U.S. National Stage of International Application No. PCT/EP2012/001963, filed May 8, 2012, which designated the United States and has been published as International Publication No. WO 2012/159707 and which claims the priority of German Patent Application, Serial No. 10 2011 102 298.1, filed May 23, 2011, pursuant to 35 U.S.C. 119(a)-(d).

BACKGROUND OF THE INVENTION

The present invention relates to a method for controlling a restraint system of a motor vehicle. The invention also relates to a restraint system for a motor vehicle. Finally the invention relates to such a motor vehicle.

In current algorithms for restraint systems in motor vehicles, the triggering of the restraint system is coupled to the exceeding of defined threshold values, which are a measure of the severity of the accident. These threshold values are for example in case of head-on accidents always defined so that a pyrotechnic seatbelt fastener is always triggered earlier in time than or simultaneous with an airbag. As a result, in accidents with buckled-in occupants a triggering of the airbag is never possible without prior triggering of the seatbelt tensioner.

In addition, the corresponding devices or adaptive system components are only actuated upon triggering of the airbag. Such adaptive system components can for example be a switchable seatbelt force limiter or controllable outlet openings of the airbag, so-called airbag vents. Thus, with triggering of the airbag all triggering decisions have been made and the further course of an accident or the course of the severity of the accident is not taken into account for the triggering decision. In addition, the triggering decisions, which for example are determined by way of measured deceleration signals of the motor vehicle, have to be made very early in order to allow the restraint systems such as seatbelt and airbag to act on the vehicle occupants.

WO 2005/03 53 19 A1 describes a motor vehicle with at least one first crash sensor, which is arranged in a safety zone of the motor vehicle and a second crash sensor which is located in a zone which may be damaged during an accident. Here, for determining the triggering signals of the restraint systems, the movement parameters of the motor vehicle, which are determined by the crash sensors, are compared to each other over different time intervals.

DE 60 2004 006 119 T2 describes a safety device for a motor vehicle wherein a safety belt and an airbag are controlled in dependence on a triggering signal which is representative of the weight of the seat occupant. This triggering signal is determined by way of the force acting on the safety belt and the acceleration that acting on the seat.

From DE 10 2008 063 111 A1 a method for controlling an airbag is known in which a ventilation device of the airbag is controlled in dependence on the position of the seat occupant on the seat.

DE 101 07 272 A1 describes a method for controlling vehicle occupant restraint systems, which are activated in dependence on a predetermined severity of an accident so that the restraining forces that act on the occupants are adjusted according to the determined severity of the accident.

SUMMARY OF THE INVENTION

The object of the present invention is to improve the effect of the restraint systems in a motor vehicle for protecting the occupants.

This object is solved according to the invention by a method for
controlling restraint systems of a motor vehicle by
determining a movement parameter of the motor vehicle,
triggering a first restraint device, optionally in dependence on the exceeding of a first predetermined threshold value or a second predetermined threshold value for the determined movement parameter,
triggering a second restraint device optionally in dependence on the exceeding of the first predetermined threshold value or the second predetermined threshold value for the determined movement parameter and
controlling a device which influences the restraining force of the first restraint device and a second device which influences the restraining force of the second restraint device in dependence on exceeding the first predetermined threshold value and/or the second predetermined threshold value.

With the method according to the invention, the control of the respective devices which influence the restraining force of the respective restraint devices occurs not only in dependence on the exceeding of a single predetermined threshold value which for example is coupled with the triggering of an airbag. The triggering of the respective devices occurs now in dependence on the exceeding of different threshold values, which are coupled to the triggering of the corresponding restraint device. The control of the device can be coupled to the triggering of the restraint device, which is influenced by the device. In this way on one hand the triggering of the restraint device and on the other hand the control of the respective devices can be adjusted in dependence on the determined movement parameter of the motor vehicle.

Such a device for influencing the restraining force of a restraint device can for example include inlet or outlet openings on an airbag which serve for filling the air back and with this control its restraining effect after its triggering. Movement parameters in this context can be the speed of the motor vehicle, the acceleration of the motor vehicle and the transverse and longitudinal accelerations acting on the motor vehicle. The movement parameter of the motor vehicle is a measure of the severity of the accident to which the triggering of the restraint devices and the associated devices or adaptive system components can be better adapted by the method.

In an advantageous embodiment, the control of the first and/or second device occurs in dependence on a duration of time. The duration of time is determined by way of a temporal course of the movement parameter. Usually corresponding timers are started after triggering a restraint device of a motor vehicle, after expiration of which the devices for influencing the restraining force of the respecting restraint device are triggered. The duration of time of the timers after which the devices are controlled, is not determined by a fixedly predetermined value but can additionally be adjusted to the temporal course of the movement parameter. In this way the triggering of the corresponding device can be adjusted particularly well to the temporal course of the accident or the crash and with this it can be contributed to increasing the safety of the vehicle occupants.

In a further embodiment of the invention, control of the first and/or second device also occurs in dependence on a duration of time, wherein the duration of time in this case is determined in dependence on the exceeding of a further predetermined threshold value for the movement parameter. A value for the duration of time of the respective timers, after expiration of which the devices are controlled, can also be determined in dependence on exceeding of a further threshold value. Thus, the dynamic of the course of the accident or the severity of the accident can be taken into account. It is also conceivable that multiple threshold values are defined wherein a correction of the initially defined timers can occur in dependence on the exceeding of the threshold values. The value for the duration of time of the timers that has been assumed beforehand can be correspondingly corrected upwards or downwards in accordance with the temporal development of the accident. The triggering event occurs when the respective timers are expired or when the special values coupled therewith are exceeded.

Advantageously, the triggering of the second restraint device occurs independent of the triggering of the first restraint device. The triggering of the restraint devices is no longer be determined by a fixed succession but can rather be adjusted to the course of the accident or the severity of the accident. In this way an accident-adaptive triggering decision is enabled which ensures a better safety for the vehicle occupants in particular in the case of head-on collisions.

Further, according to the invention a restraint system is also provided for a motor vehicle with
- at least one first crash sensor for detecting a movement parameter of the motor vehicle,
- a first and a second restraint device,
- a first device with which a restraining force of the first restraint device can be influenced
- a second device with which a restraining force of the second restraint device can be influenced, and
- a control device for triggering the first restraint device optionally in dependence on the exceeding of a first predetermined threshold value or a second predetermined threshold value for the detected movement parameter, for triggering a second restraint device optionally in dependence on the exceeding of the first predetermined threshold value or the second predetermined threshold value for the detected movement parameter, and for controlling the first and second device in dependence on the exceeding of the first predetermined threshold value and/or the second predetermined threshold value.

Crash sensors that can be used include environmental sensors such as camera-based sensors, radar sensors, Lidar-sensors or body sound sensors. Also speed sensors, acceleration sensors or pressure sensors can be used in order to determine a movement parameter of the motor vehicle. In addition, multiple of the aforementioned crash sensors can be used in combination.

Preferably, the first and/or second device is controlled in dependence on a duration of time. Here the duration of time is either determined by way of a temporal course the movement parameter or in dependence on the exceeding of a further predetermined threshold value for the movement parameter.

Preferably the first restraint device of the restraint system includes a seatbelt tensioner and the second restraint device an airbag. Advantageously, the first device of the restraint system includes a seatbelt force limiter and the second device one or multiple controllable outlet openings of the airbag, so-called airbag vents.

In this way, the effect of the described restraint system for the protection of the occupants can be significantly improved, in particular in the case of head-on accidents, because the triggering of the airbag is now independent of the triggering of the pyrotechnic seatbelt tensioner. Further, the triggering decisions can occur earlier than previously, which generally allows the restraining effect of the vehicle occupants by the restraint systems to occur earlier. As a result of the adaptive triggering of the switchable seatbelt force limiter and the adaptive airbag vent, the restraining effect of the restraint systems seatbelt and airbag can be adjusted to the severity of the accident. By taking a greater time for the accident course into account, the triggering decisions can be made more confidently. This applies in particular to the case in which the actual course of the accident proves more severe at a later point in time than the temporal course of the severity of the accident would have allowed to assume. Further, as a result of the adaptive adjustment of the triggering decisions, the restraining effect of the restraint devices, such as seatbelt and airbag can be further improved.

Finally, a motor vehicle is provided according to the invention with a restraint system described above.

BRIEF DESCRIPTION OF THE DRAWING

The present invention is now explained in more detail by way of the included drawings. These show in FIG. 1 a diagram in which the temporal course of a movement parameter of a motor vehicle is shown and in which the triggering time points of restraint devices and the associated devices are shown according to the state-of-the-art, FIG. 2 a flow chart, which shows a method for controlling restraint systems of motor vehicle according to the state-of-the-art, FIG. 3 a diagram in which the temporal course of the movement value of the motor vehicle is shown and the triggering time points of restraint devices and the associated devices is shown, and FIG. 4 a flow chart of the method according to the invention for controlling restraint devices of a motor vehicle.

DETAILED DESCRIPTION OF PREFERRED EMBODIMENTS

Figure 1:
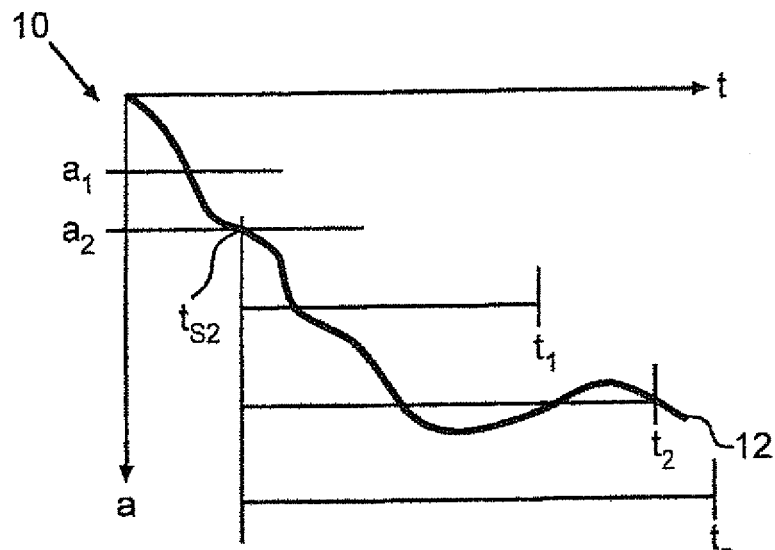

FIG. 1 shows in a diagram 10 the temporal course of a movement parameter a of a motor vehicle according to the state-of-the-art. The curve 12 shows here the course of the movement parameter a in dependence on the time t. The movement parameter a can for example be the speed, acceleration or the longitudinal or transverse acceleration of the motor vehicle. Preferably, the movement parameter a describes the speed, deceleration of a motor vehicle. It is also a measure for the severity of the accident. When the movement parameter a exceeds a first predetermined threshold value a1, the first restraint device is triggered. The first restraint device of the motor vehicle can for example be a seatbelt tensioner. When the movement parameter a of the motor vehicle exceeds a second predetermined threshold value $a_2$ a second restraint device of the motor vehicle is triggered. The second restraint device of the motor vehicle can for example be an airbag, in particular a front airbag. The triggering of the airbag occurs according to the stateof-the-art in dependence on the exceeding of the threshold value $a_2$ which has a higher value than the threshold value a1. Thus, the triggering of the seatbelt tensioner occurs always prior to the triggering of the airbag.

Upon reaching the threshold value $a_2$, the time point $t_{s2}$ is simultaneously defined at which the respective timers are started, after the expiration of which the devices for influencing the respective restraining force are triggered. Thus, for example after expiration of a first timer at the time point $t_1$ a switchable seatbelt limiter is controlled. After expiration of a second time an adaptive airbag vent is for example controlled at the time point $t_2$. Likewise, after expiration of a further timer at the time point $t_n$ further devices can be triggered which influence the restraining force of the respective restraint device.

Figure 2:
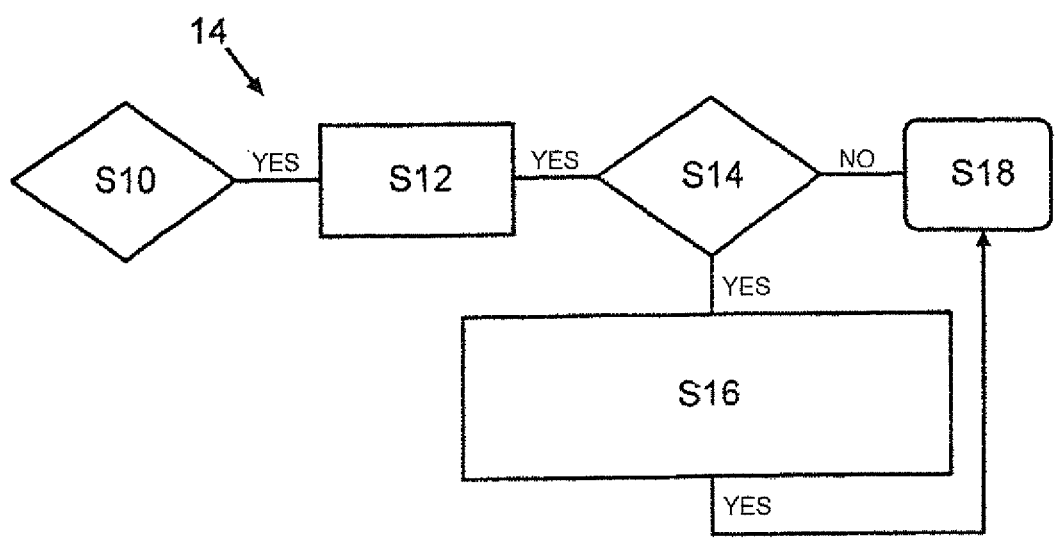

FIG. 2 shows a flow chart of a method for controlling restraint devices of a motor vehicle according to the state of the art. Here, it is first tested in a step S10 whether a first predetermined threshold value a1 for the detected parameter a is exceeded. When the predetermined threshold value a1 is exceeded the first restraint device of the motor vehicle is triggered in a step S12, for example a pyrotechnic seatbelt tensioner. In a further step S14 it is now tested whether a second predetermined threshold value $a_2$ of movement parameter a of the motor vehicle is exceeded. When the threshold value $a_2$ is not exceeded the method is terminated in step S18. However, when the threshold value $a_2$ is exceeded, the second restraint device is triggered in a step S16 for example the airbag. In addition, the different timers are started in step S16, which control the triggering of the seatbelt force limiter and the airbag vent.

Figure 3:
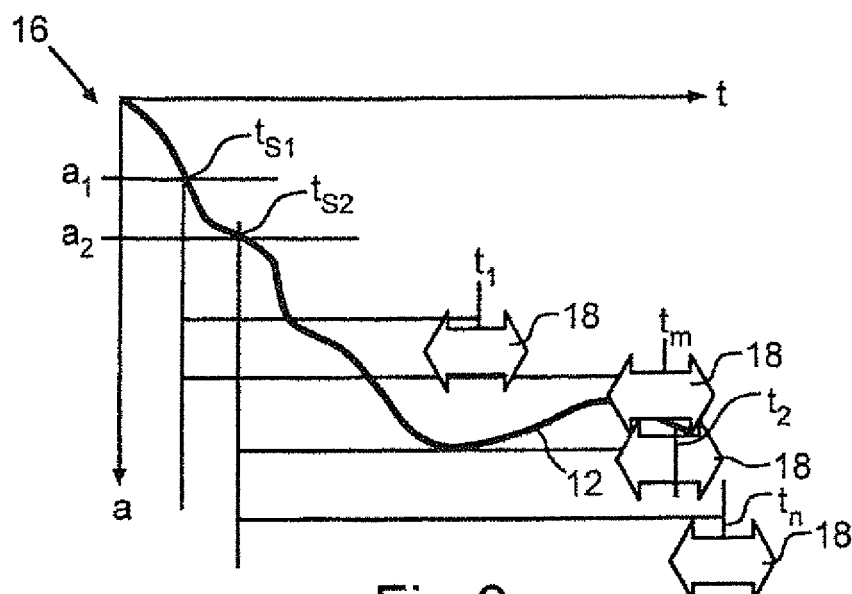

FIG. 3 shows in a further diagram 16 the temporal course of the movement parameter a in dependence on the time t. Here, the triggering of the restraint devices and the control of the devices, which influence the restraining force of the respective restraint devices is shown according to the method according to the invention. Here, a first restraint device is also triggered after reaching a first threshold value a1. Also a second restraint device is triggered after reaching the second threshold value $a_2$. The triggering of the first and the second restraint devices can optionally occur in dependence on the exceeding of the first threshold value a1 or the second threshold value $a_2$.

In the method according to the invention, exceeding the second threshold value $a_2$ also defines a time point $t_{s2}$. In addition, after reaching the first threshold value $a_1$ a further time point $t_{s1}$ is defined. Corresponding time values of the timers after the expiration of which the devices are triggered are not only determined in dependence on the reaching of the time point $t_{s2}$ or the threshold value $a_2$ but also in dependence on reaching the time point $t_{s1}$ or the threshold value $a_1$. Thus for example a first timer is started at the time point $t_{s1}$, wherein after expiration of the timer at the time point $t_1$ the seatbelt tensioner is triggered. It is also conceivable that multiple further timers are triggered at the time point $t_{s1}$ which for example expire at the time point tm and trigger a corresponding device which influences the seatbelt tensioner or other restraint devices.

The time points $t_1$, $t_2$, $t_m$ and $t_n$ of the respective timers are adjusted in dependence on the severity of the accident. This can occur by way of the temporal course of the movement parameter a. As an alternative a further predetermined threshold value for the movement parameter a can be determined, and wherein the time points $t_1$, $t_2$, $t_m$ and $t_n$ are corrected in dependence on this threshold value. The time points $t_1$, $t_2$, tm and $t_n$ can now be correspondingly adjusted or corrected in dependence on the severity of the accident and in dependence on the temporal course of the accident. This is shown in FIG. 3 by the arrows 18.

Figure 4:
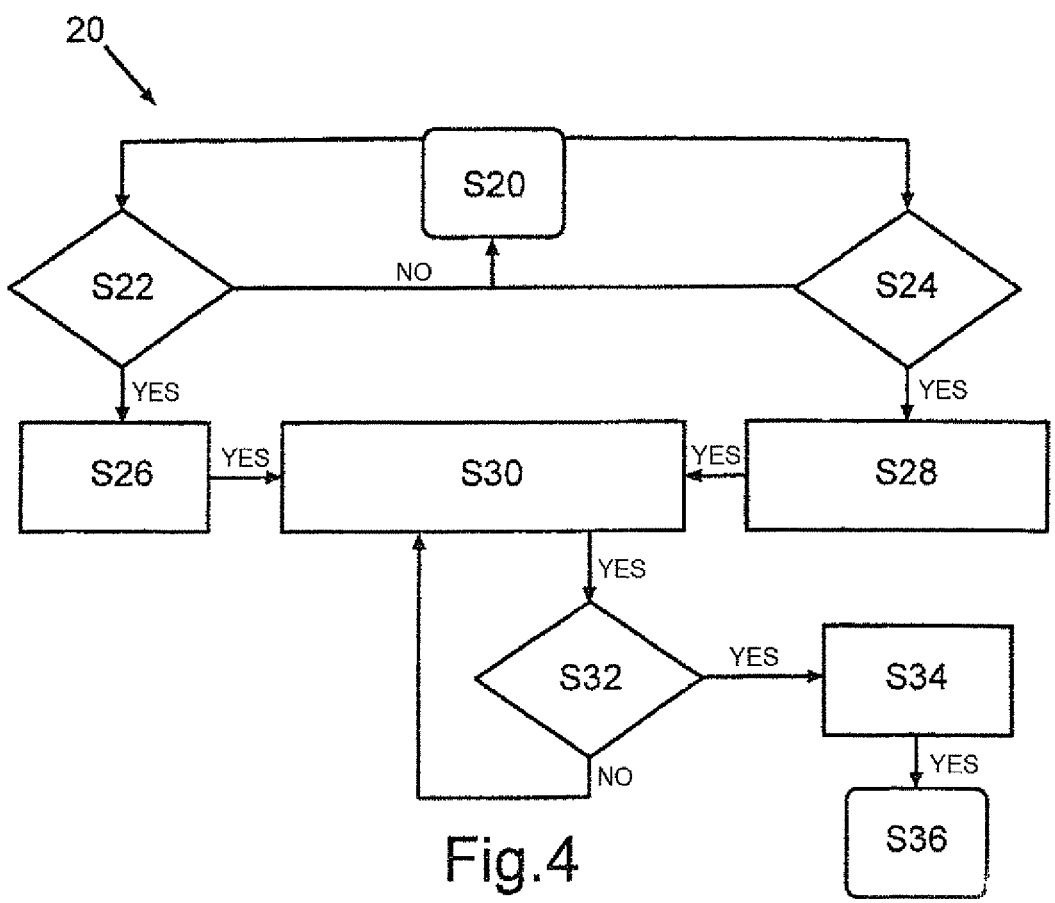

FIG. 4 shows a schematic flow chart 20 of the method according to the invention for controlling restraint devices of a motor vehicle. Here, the method is first started in a step S20 in that a movement parameter a of the motor vehicle is detected. Subsequently it is tested in a step S22 whether a first predetermined threshold value a1 for the movement parameter a is exceeded. In parallel thereto it is tested in a step S24 whether a second predetermined threshold value $a_2$ for the movement parameter a is exceeded.

If step S22 yields the result that the first predetermined threshold value a1 is not exceeded, the method is continued in step S20 in that it is started anew. However, if it is determined in step S22 that the first predetermined threshold value $a_1$ is exceed the first restraint device for example the pyrotechnic seatbelt tensioner is triggered in step S26. Also the timer is started in step S26 which causes triggering of the seatbelt limiter.

If it is determined in step S24 that the second predetermined threshold value $a_2$ of the movement parameter a is not exceeded, the method is continued in step S20 in that it is started anew. If, however, it is determined in step S24 that the second predetermined threshold value $a_2$ is exceeded, the airbag is triggered in step S28. In addition the timer is started which causes triggering of the adaptive airbag vent.

In a step S30 the further course of the severity of the accident is now tested and the corresponding values for time points $t_1$ $t_2$ tm and $t_n$ after expiration of which the respective devices are triggered, are adjusted or corrected by way of the temporal course and/or the severity of the accident. Subsequently it is tested in a step S32 whether at the respective time points $t_1$, $t_2$ $t_m$ and $t_n$ the associated values for the timers are reached. If this is not the case the method is continued in step S30. However, if it is determined in step S32 that at the time points $t_1$, $t_2$ $t_n$ or tm the respective values for the timers are reached, the respective device which influences the restraining force of the respective restraint device is triggered in step S34. Finally the method is terminated in step S36.

With the method according to the invention, the triggering of restraint devices and the associated devices can occur more reliably in motor vehicles and with this the safety of the vehicle occupants be improved.

The invention claimed is:

1. A method for controlling restraint devices of a motor vehicle comprising:
   detecting a movement parameter of the motor vehicle;
   triggering a first restraint device in response to exceeding a first predetermined threshold value for the detected movement parameter;
   triggering a second restraint device in response to exceeding a second predetermined threshold value;
   controlling timers in dependence on a duration of time to thereby activate a first device which influences a restraining force of the first restraint device and a second device which influences a restraining force of the second restraint device in response to exceeding the first predetermined threshold value for the first restraint device and the second predetermined threshold value for the second restraint device, thereby influencing the restraining force of the first restraint device and the restraining force of the second restraint device, such that a sequence in which the first and second restraint devices are triggered is in a fixed succession, in which said fixed succession, the second restraint device is triggered, only if the first restraint device has been triggered earlier in time, said duration of time being determined as a function of a temporal course of the movement parameter and being adjusted or corrected in dependence of a severity of an accident and in dependence of the temporal course of the accident; and adjusting a restraining effect of the first restraint device and the second restraint device according to the severity of the accident, in which, the severity of an actual course of the accident progressively increases with time.

2. The method of claim 1, wherein the duration of time is determined as a function of exceeding a further predetermined threshold value for the movement parameter.

3. A restraint system for a motor vehicle, comprising:
at least one crash sensor for detecting a movement parameter of the motor vehicle;
a first restraint device;
a second restraint device;
a first device constructed for influencing a restraining force of the first restraint device;
a second device constructed for influencing a restraining force of the second restraint device; and
a control device, said control device triggering the first restraint device in response to exceeding a first predetermined threshold value for the detected movement parameter, said control device triggering a second restraint device in response to exceeding a second predetermined threshold value, said control device including timers to control the first and second devices in response to exceeding the first predetermined threshold value, thereby influencing the restraining force of the first restraint device and the restraining force of the second restraint device, such that a sequence in which the first and second restraint devices are triggered is in a fixed succession, in which said fixed succession the second restraint device is triggered, only if the first restraint device has been triggered earlier in time, said duration of time being determined as a function of a temporal course of the movement parameter and being adjusted or corrected in dependence of a severity of an accident and in dependence of the temporal course of the accident, such that a restraining effect of the first restraint device and the second restraint device is adjusted according to the severity of the accident, in which, the severity of an actual course of the accident progressively increases with time.

4. The restraint system of claim 3, wherein the duration of time is a function of exceeding a further predetermined threshold value for the movement parameter.

5. The restraint system of claim 3, wherein the first restraint device includes a seatbelt tensioner and the second restraint device includes an airbag.

6. The restraint system of claim 3, wherein the first restraint device includes a seatbelt limiter and the second restraint device includes a controllable outlet opening of the airbag.

7. A motor vehicle comprising the restraint system of claim 3.

8. The method of claim 1, wherein the detecting of the movement parameter of the vehicle is done with a camera-based sensor, radar sensor, rider sensor, body sound sensor, speed sensor, acceleration sensor, pressure sensor, or any combination thereof.

9. The restraint system of claim 3, wherein the at least one crash sensor for detecting the movement parameter of the vehicle is a camera-based sensor, radar sensor, lidar sensor, body sound sensor, speed sensor, acceleration sensor, pressure sensor, or any combination thereof.

* * * * *